May 29, 1962 G. R. NELSON 3,036,780
SPRINKLING METER
Filed Sept. 19, 1961 2 Sheets-Sheet 1

INVENTOR.
GORMAN R. NELSON
BY
Williamson & Palmatier
ATTORNEYS

May 29, 1962  G. R. NELSON  3,036,780
SPRINKLING METER
Filed Sept. 19, 1961  2 Sheets-Sheet 2
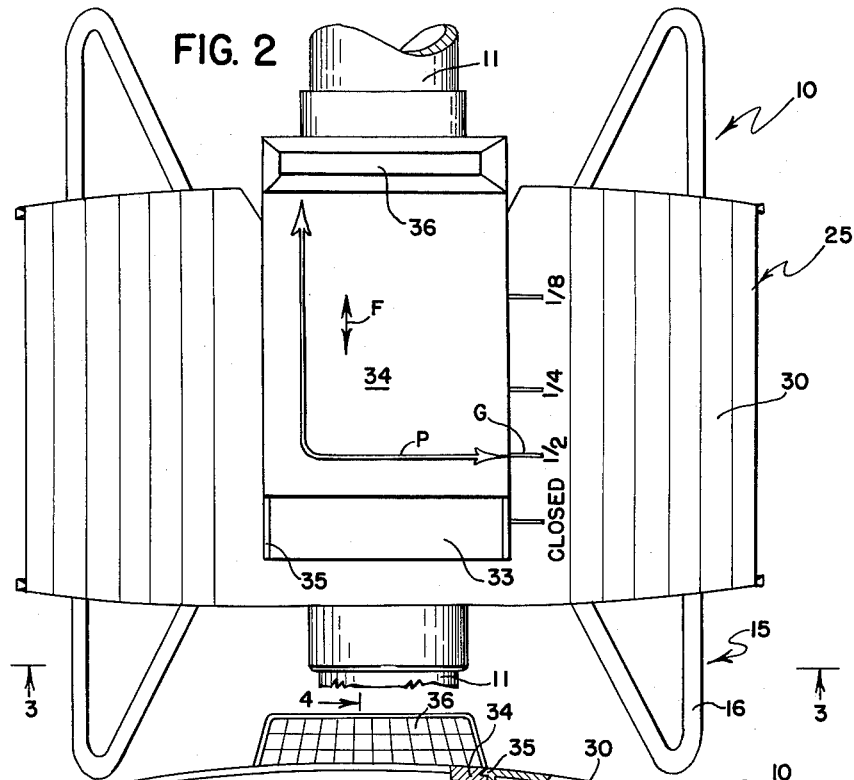
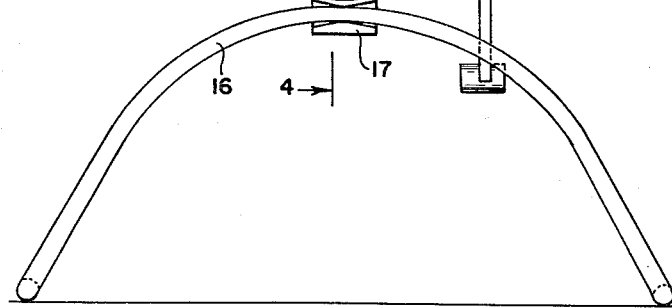
INVENTOR.
GORMAN R. NELSON
BY
Williamson & Palmatier
ATTORNEYS United States Patent Office 3,036,780
Patented May 29, 1962

3,036,780
SPRINKLING METER
Gorman R. Nelson, Canyon Lake Heights,
Rapid City, S. Dak.
Filed Sept. 19, 1961, Ser. No. 139,255
8 Claims. (Cl. 239—65)

This invention relates to an actuating device operating in response to sprinkling, as by a garden sprinkler, of a predetermined quantity of water, and more particularly relates to a valve-operating device for shutting off the water to a sprinkler when a predetermined amount of water has been sprinkled.

Although such devices of this general type have been known previously, none of the previously known devices have been commercially satisfactory. The primary reason for this is that such previously known devices have been unduly complicated and expensive. Furthermore, such previously known devices have involved intricate mechanisms which are difficult to maintain in proper working condition.

With these comments in mind, it is to the elimination of these and other disadvantages to which the present invention is directed, along with the inclusion therein of other novel and desirable features.

An object of my invention is to provide a new and improved sprinkled water metering device of simple and inexpensive construction and operation.

Another object of my invention is to provide a novel control device producing a desired function in response to sensing of the sprinkling of a predetermined quantity of water.

A further object of my invention is the provision of a novel and improved sprinkling meter for measuring the quantity of water sprinkled by a lawn and garden sprinkler and shutting off the sprinkler when a predetermined quantity of water has been sprinkled.

A still further object of my invention is the provision of a new and novel gravity operated sprinkled water metering device which is readily and easily adjustable over a wide range to turn off a sprinkler when a preselected quantity of water has been sprinkled and so that said quantity may be readily and easily varied as the garden sprinkler is sequentially used in any of a number of areas.

These and other objects and advantages of the invention will more fully appear from the following description made in connection with the accompanying drawings wherein like reference characters refer to the same or similar parts throughout the several views and in which:

FIG. 2 is a top plan view of the invention;

FIG. 3 is a rear elevation view of the invention and being partly broken away and shown in section for clarity of detail;

Figure 1:
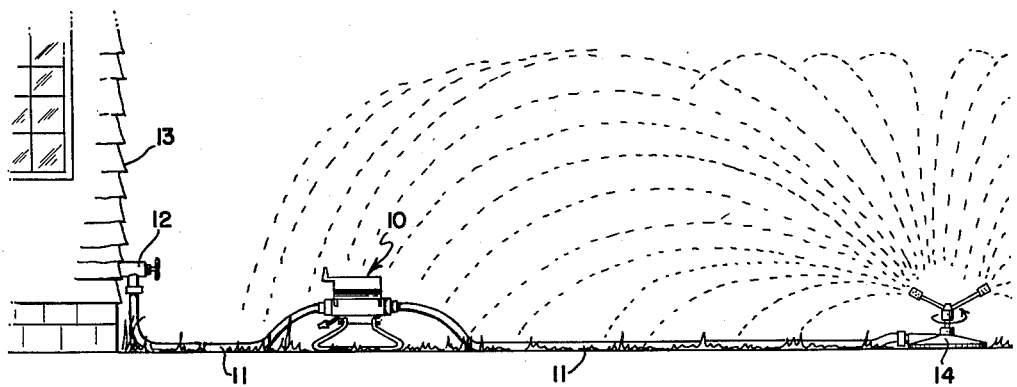
FIG. 1 is a somewhat diagrammatic elevation view showing the present invention assembled with a hose supplying water to a sprinkler.

One form of the present invention is shown in the drawings and is shown herein. The sprinkling meter is indicated in general by numeral 10 and is shown in FIG. 1 connected between two sections 11 of garden hose which is supplying water from a faucet 12 on a house 13 to a sprinkler 14. It will be noted that the sprinkling meter 10 is disposed relatively close to the sprinkler 14 so the water being sprinkled from the sprinkler 14 falls onto the sprinkler metering device 10. Although the distance between the sprinkler and metering device 10 may vary, depending upon the type of sprinkler being used, it has been found satisfactory in use of small rotary type sprinklers to place the sprinkling meter approximately four feet from the sprinkler.

The sprinkling metering device 10 includes a stationary bottom frame 15 which includes ground-engaging feet 16 constructed of rigid metal rod and which is affixedly secured to a rigid body casting 17 which defines a water conduit 18 having male and female hose connections 19 and 20 on the opposite ends thereof and adapted for connection to the hose sections 11. The rigid body portion 17 includes a pair of upstanding ribs or ears 21 and 22 which are formed integrally of the body 17 and which have pivot pins 23 and 24 respectively affixed thereon and disposed in alignment with each other to define a horizontal tilt axis extending longitudinally with respect to the conduit 18.

The pivots 23 and 24 swingably mount an upper tiltable member 25 which defines a receptacle 26 having a transversely inclined bottom 27 so as to asymetrically shape the receptacle 26 with respect to a vertical plane through the tilt axis defined by pivots 23 and so as to define an enlarged water-collecting chamber 26a at one side of the tiltable member 25. It will be seen that the pivots 23 and 24 respectively extend through bearing apertures 28 in the opposite end walls 29 of the tiltable member 25 and that the apertures 28 are disposed adjacent the lower portions of the tiltable member so that the center of gravity of the tiltable member 25 is actually disposed above the pivots 23 and 24.

The tiltable member 25 has a rigid and generally arched top 30 which is affixed to the end and side walls 29 and 31 of the receptacle and to the opposite sidewall 32 of the tiltable member, which, as will be clearly seen in FIG. 3, is substantially thicker than the sidewall 31 so as to provide extra weight at the wall 32 to bias the tiltable member 25 against tilting in the direction of arrow A. It will be understood that the biasing provided by the weight of wall 32 also offsets up to a predetermined quantity of water in the receptacle 26, which water tends to cause tilting of the member 25 in the direction of arrow A. When the receptacle 26 is supplied with water in excess of said predetermined quantity, the member 25 will then tilt in the direction of arrow A.

The rigid top 30 has an enlarged, generally rectangular opening 33 therein which defines an open top for the receptacle 26 in order to receive the water which is sprinkled from a sprinkler 14. A rigid cover 34 is provided for closing the opening 33 and for varying the area of the opening 33 so as to control the rate at which sprinkled water is allowed to enter the receptacle 26. It will be understood that if the cover is shifted so that the opening 33 defines a very substantial area of access for sprinkled water, the receptacle 26 will be filled with water considerably sooner than if the opening 33 is decreased in size so as to restrict the area of access to the receptacle. It will be noted that the top surface 34a of the cover is also arched to the same curvature as the top 30 so as to direct water which is sprinkled onto the surface 34a away from the opening 33.

Means are provided for mounting the cover 33 on the rigid top 30 for sliding movement in a direction parallel to the tilt axis of pivots 23 and 24. In the form shown, such means comprise a dovetail tongue and groove sliding joint 35 along the longitudnal side edges of the cover 34 so as to permit sliding of the cover in the directions of arrows F. The dovetail joint 35 between the side edges of the cover and rigid top 30 define a substantially watertight seal. The cover 34 is also provided with an upwardly projecting flange portion 36 which defines a handle or gripping portion to facilitate ready and easy manipulation of the cover 34.

It will be seen that the conduit 18 has an inwardly protruding annular flange 37 formed integrally of the body 17 and defining a central flow area 38 therethrough and an annular valve seat 39 against which the ball valve element 40 will seat and be held in seated condition by the pressure of the water which causes flow of water in the direction of arrow W.

Means are provided for retaining the ball valve element adjacent the valve seat 39, and in the form shown, such means comprise a retaining element or screen 41 which might also comprise a bar across the inlet portion of the conduit. Of course the flat portion is provided with a gasket 42 for seating against the fitting of the hose section 11.

The valve mechanism is also provided with a rotary valve-operating element or shaft 43 which extends transversely across the conduit 18 and is journalled therein and the rotary valve-operating element also projects transversely outwardly at one side of the body 17. A substantially rigid rod or wire 44 extends through a suitably provided aperture in the shaft 33 and is affixed therein and has an upwardly extending curved portion 44a which defines a curved camming surface 44b cooperatively engaging a substantially planar camming surface 27a at the bottom side of the inclined bottom 27 of the receptacle. It will be understood that when the tiltable member 25 is tilted in the direction of arrow A, the cooperating camming surfaces 27a and 44b cause swinging of the rod 44 and shaft 43 in the direction of arrow S. The lower end of the rod 44 is provided with a weight 45 which normally retains the upper end 44a of the rod against the surface 27a.

Figure 4:
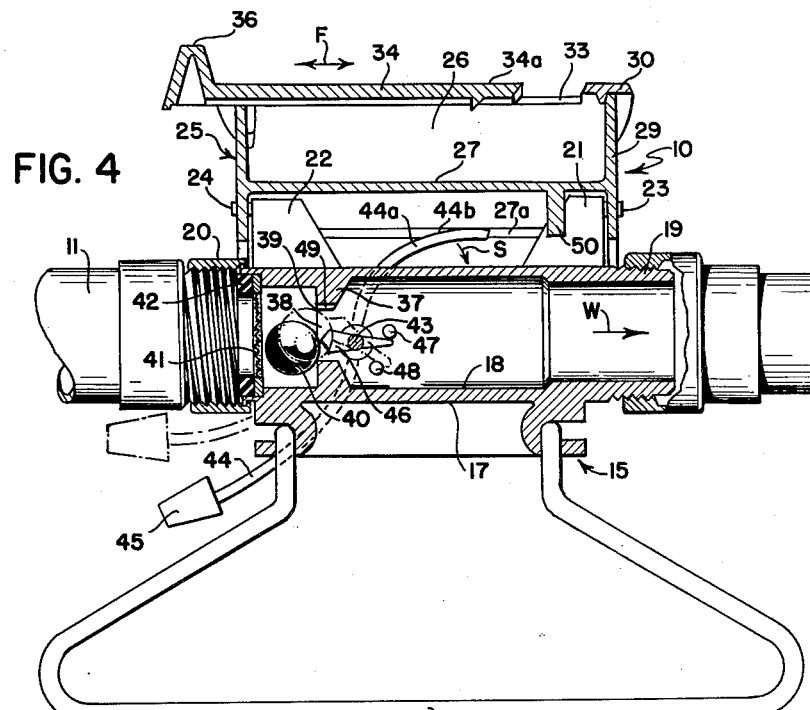
FIG. 4 is a longitudinal section view taken approximately at 4—4 in FIG. 3.

The shaft 43 has a rigid ball valve moving element or finger 46 affixed thereto and extending transversely thereof into the flow area 38 so as to engage the ball valve element 40 adjacent the seat 39. The finger 46 is designed so as to engage and hold the ball in a stationary position when the ball valve element 40 is off the valve seat as seen in full lines in the drawings. The rear end of the finger 46 normally lies against an inwardly protruding rigid pin 47 in the conduit 18 and is restrained against further movement in a counter-clockwise direction as seen in FIG. 4 by the pin 47.

It will be seen that the ball valve moving finger 46 is swingable with the shaft 43 and rod 44 to the dotted line position shown in FIG. 2 wherein the ball valve element 40 is permitted to seat against the valve seat 39. The rear end of the finger 46 is restrained against excessive clockwise rotation as seen in FIG. 4 by a second pin 48.

The valve seat 39 has a notch 49 to relieve water pressure when the ball valve element closes quickly and there prevent minimized water hammer effect in the flexible hose 11.

The tiltable member 25 is normally prevented from tilting in a direction opposite to arrow A by a rigid depending stop 50 formed integrally of the bottom 27 of the receptacle and depending therefrom for engagement with the upwardly protruding ear 21 of the rigid body 17.

In the use and operation of the present invention, the metering device 10 will be connected into the supply hose for the sprinkler 14 in the fashion shown in FIG. 1 so as to be positioned within the area over which water is being sprinkled. The tiltable member 25 is oriented in the position shown in FIG. 3 so as to be in a horizontal position with the weighted sidewall 32 biasing the stop 50 against the ear 21, thereby holding the opening 33 for the receptacle in a substantially horizontal position. The cover 34 is adjusted to the proper position so as to make the opening 33 of proper size to admit sprinkled water at a desired rate. The cover 34 and top 30 may be provided with a pointer P and graduations G to indicate the proper positioning of the cover in order to obtain a certain amount of water applied over the sprinkled area during the time in which it takes receptacle 26 to be filled. For instance, if it is desired to sprinkle a half inch of water over the sprinkled area, one cover setting will be used; but if it is desired to cover the sprinkled area with one inch of sprinkled water, the cover will be adjusted so as to reduce the size of opening 33 and reduce the rate at which the receptacle 26 is filled, thereby allowing additional time of sprinkling and a greater depth of coverage of the sprinkled area.

Of course it will be necessary to make sure that the weight 45 on rod 44 has been swung downwardly so as to make sure that the finger 46 has pushed the ball valve element off the seat 39. In this position, the finger element 46 is substantially aligned with the direction W of flow, so as to minimize the effect of the flowing water on the finger element which might tend to otherwise swing the element 46 to the dotted line position thereof and permit closing of the valve.

As the sprinkled water drops into the opening 33, the water will collect on the bottom 27 and run downwardly into the enlarged chamber portion 26a of the receptacle 26. As the depth of water builds up in the receptacle 26, the tendency is for the tiltable member 25 to tilt in the direction of arrow A. However, until a predetermined quantity of water has been collected in the receptacle, the weighted sidewall 32 maintains the tiltable member in the horizontal position shown in FIG. 3.

When the receptacle 26 has been filled with a predetermined quantity of water, the weight of the water in the enlarged chamber portion 26a overbalances the weight of the sidewall 32 and the tiltable member 25 tilts in the direction of arrow A. Tilting of the member 25 causes camming between the surfaces 27a and 44b of rod 44 and causes downward swinging in the direction of arrow S of the rod 44 and corresponding rotation of the shaft 43. The rotation of shaft 43 produces an indication that the preselected quantity of depth of water has been sprinkled by the sprinkler 14. More specifically, the indication produced consists in the shutting off of the supply of water to the sprinkler. The finger 46 is swung away from ball 40 and the ball valve element 40 is thereby released and the pressure of the water flowing causes the ball valve element to engage the valve seat 39 and stop the water. The sprinkler is thereby shut off.

Before the sprinkler is operated again, the receptacle 26 will be emptied of water.

It will, of course, be understood that various changes may be made in the form, details, arrangement and proportions of the parts without departing from the scope of my invention which consists of the matter shown and described herein and set forth in the appended claims.

What I claim is:

1. A control apparatus for sensing and indicating the sprinkling of a predetermined quantity of water, said apparatus comprising a stationary frame, a tiltable member defining a receptacle and having upper and lower portions and also having spaced first and second side portions disposed opposite each other, pivot means on said frame and mounting said tiltable member adjacent said lower portion and between said side portions for tilting about a horizontal axis, said receptacle having an open top for receiving sprinkled water and also having an enlarged chamber portion spaced toward said first side portion from said pivot means for collecting water, the weight of which tends to move said first side downwardly to tilt said member in a first direction, means preventing tilting of said member in a second direction opposite to said first direction, biasing means normally restraining said tiltable member against tilting in said first direction, said biasing means also offsetting the weight of up to a predetermined quantity of water in said chamber portion and allowing said member to tilt in said first direction when water in excess of said predetermined quantity is supplied to said chamber portion, an operable, indication-producing mechanism on said frame and including a movable actuating element for operating said mechanism when said element is moved, and means connecting said element with said tiltable member and producing movement of the element in response to tilting of said member, whereby to produce an indication of the collection of an amount of water in excess of said predetermined quantity.

2. A sprinkler control apparatus controlling the supply of water for the sprinkler, said apparatus comprising a stationary frame, a tiltable member defining a receptacle and having upper and lower portions and also having spaced first and second side portions disposed opposite each other, pivot means on said frame and mounting said member adjacent said lower portion and between said side portions for tilting about a horizontal axis, said receptacle having an open top for receiving sprinkled water and also having an enlarged chamber portion spaced toward said first side portion from said pivot means for collecting water, the weight of which tends to move said first side portion downwardly to tilt said member in a first direction, means preventing tilting of said member in a second direction opposite to said first direction, biasing means normally restraining said member against tilting in said first direction, said biasing means also offsetting the weight of up to a predetermined quantity of water in said chamber portion and allowing said member to tilt when water in excess of said predetermined quantity is supplied to said chamber portion, a flow conduit on the frame for supplying water therethrough and to such a sprinkler, a valve mechanism regulating flow through said conduit and having a movable valve-operating element, and means connecting said valve-operating element with said tiltable member and producing movement of the element in response to tilting of the member, whereby to operate said valve in response to collection of water in excess of said predetermined quantity in the chamber portion.

3. A control apparatus for sensing and indicating the sprinkling of a predetermined quantity of water, said apparatus comprising a stationary frame, a tiltable member defining a receptacle and having upper and lower portions and also having spaced first and second side portions disposed opposite each other, pivot means on said frame and mounting said tiltable member adjacent said lower portion and between said side portions for tilting about a horizontal axis, said receptacle having an open top for receiving sprinkled water and also having an enlarged chamber portion spaced toward said first side portion from said pivot means for collecting water, the weight of which tends to move said first side downwardly to tilt said member in a first direction, means preventing tilting of said member in a second direction opposite to said first direction, biasing means normally restraining said tiltable member against tilting in said first direction, said biasing means also offsetting the weight of up to a predetermined quantity of water in said chamber portion and allowing said member to tilt in said first direction when water in excess of said predetermined quantity is supplied to said chamber portion, a cover overlying the open top of said receptacle, means mounting the cover on the receptacle for substantially horizontal sliding movement parallel to the axis of tilting for varying the area of access into the open top and thereby varying the rate at which sprinkled water is supplied into the receptacle, an operable indication-producing mechanism on said frame and including a movable actuating element for operating said mechanism when said element is moved, and means connecting said element with said tiltable member and producing movement of the element in response to tilting of said member, whereby to vary the time necessary to collect said predetermined quantity of water for producing said indication.

4. A control apparatus for sensing and indicating the sprinkling of a predetermined quantity of water, said apparatus comprising a stationary frame, a tiltable member defining a receptacle and having upper and lower portions and also having spaced first and second side portions disposed opposite each other, pivot means on said frame and mounting said tiltable member adjacent said lower portion and between said side portions for tilting about a horizontal axis, said receptacle having an upwardly facing access opening for receiving sprinkled water and also having an enlarged chamber portion spaced toward said first side portion from said pivot means for collecting water, the weight of which tends to move said first side downwardly to tilt said member in a first direction, means preventing tilting of said member in a second direction opposite to said first direction, biasing means normally restraining said tiltable member against tilting in said first direction, said biasing means also offsetting the weight of up to a predetermined quantity of water in said chamber portion and allowing said member to tilt in said first direction when water in excess of said predetermined quantity is supplied to said chamber portion, a cover overlying said upwardly facing access opening, means mounting the cover on the receptacle for substantially horizontal sliding movement parallel to the axis of rotation to vary the size of said access opening, the cover having an upper surface sloping away from said access opening to direct water sprinkled onto the cover away from the opening, an operable indication-producing mechanism on said frame and including a movable actuating element for operating said mechanism when said element is moved, and means connecting said element with said movable member and producing movement of the element in response to tilting of said member, whereby to accurately measure the time required for sprinkling of said predetermined quantity of water through the access opening, the size of which controls said time, and to produce an indication when the predetermined quantity of water has been collected.

5. A sprinkler control apparatus controlling the supply of water for the sprinkler, said apparatus comprising a stationary frame, a tiltable member defining a receptacle having upper and lower portions and also having spaced first and second side portions disposed opposite each other, pivot means on said frame and mounting said tiltable member adjacent the lower portion thereof and between said side portions for tilting about a horizontal axis, said receptacle having an open top for receiving sprinkled water and also having an enlarged chamber portion spaced toward said first side portion from said pivot means for collecting water, the weight of which tends to move said first side portion downwardly to tilt said member in a first direction, means preventing tilting of said member in a second direction opposite to said first direction, biasing means normally restraining said member against tilting in said first direction and also offsetting the weight of up to a predetermined quantity of water in said chamber portion and allowing said member to tilt when water in excess of said predetermined quantity is supplied to said chamber portion, a flow conduit on the frame for supplying water therethrough and to said sprinkler, a valve mechanism regulating flow through said conduit and having a rotary valve-operating element, said valve-operating element and said tiltable member having camming surfaces producing rotary movement of said valve-operating element in response to tilting of said tiltable member, whereby to operate said valve in response to collection of water in excess of said predetermined quantity in said chamber portion.

6. The invention set forth in claim 2, wherein said valve mechanism includes an annular valve seat in said conduit, a ball valve element freely mounted in said conduit adjacent said valve seat and normally held on the seat by water pressure, said movable valve-operating element having means for engaging and moving said ball element away from the seat and for holding said ball element in unseated position, said valve-operating element being moved by said tiltable member to permit the ball element to move against the seat, whereby to stop the flow of water in the conduit in response to tilting of said tiltable member.

7. A sprinkler control apparatus controlling the supply of water for the sprinkler, said apparatus comprising a stationary frame, a tiltable member defining a receptacle and having upper and lower portions and also having spaced first and second side portions disposed opposite each other, pivot means on said frame and mounting said tiltable member adjacent the lower portion thereof and between said side portions for tilting about a horizontal axis, said receptacle having an open top disposed above the pivot means and being symmetrically formed on opposite sides of the tilting axis, said receptacle also having an inclined bottom sloping downwardly toward said first side to define an enlarged chamber portion adjacent said first side portion for collecting water, the weight of which tends to move said first side portion downwardly to tilt said member in a first direction, means preventing tilting of said member in a second direction opposite to said first direction, biasing means normally restraining said member against tilting in said first direction and also offsetting the weight of up to a predetermined quantity of water in said chamber portion and allowing said member to tilt when water in excess of said predetermined quantity is supplied to said chamber portion, a cover overlying said open top of the receptacle, means mounting said cover on the receptacle for substantially horizontal sliding movement parallel to the tilting axis, a flow conduit on the frame for supplying water therethrough and to such a sprinkler and said flow conduit having opposite ends with male and female hose connections thereon, a valve mechanism regulating flow through said conduit and having a movable valve-operating element, and means connecting said valve-operating element with said tiltable member and producing movement of said valve-operating element and closing of the valve mechanism in response to tilting of said member, whereby to stop the flow of water through the conduit to the sprinkler when a preselected quantity of water has been sprinkled by the sprinkler.

8. The invention set forth in claim 1 wherein said biasing means comprises a weight at said second side portion and spaced outwardly from said pivot means and operating under the influence of gravity for restraining tilting of said tiltable member in said first direction.

References Cited in the file of this patent

UNITED STATES PATENTS

| | | |
|---|---|---|
| 865,111 | Koerber et al. | Sept. 3, 1907 |
| 1,057,781 | Sheldon | Apr. 1, 1913 |
| 2,004,194 | Lacy-Mulhall | June 11, 1935 |
| 2,894,717 | Camp et al. | July 14, 1959 |